Figure 1:
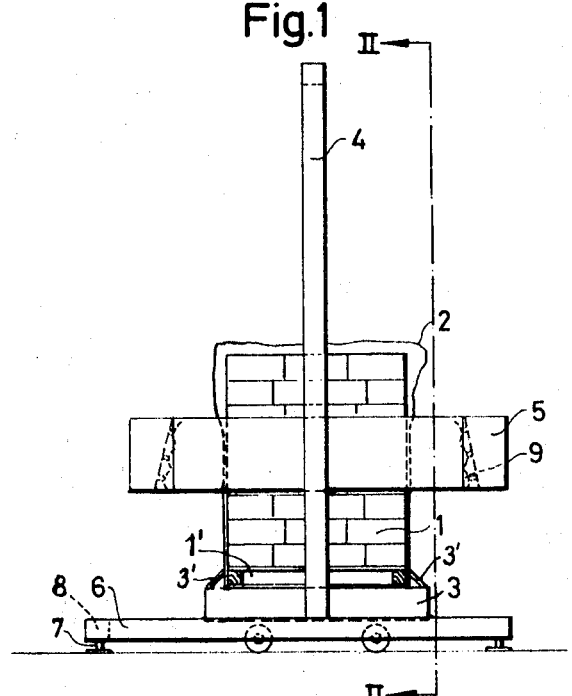

United States Patent

[11] 3,581,458

| [72] | Inventor | Olov Erland Gustavsson<br>Industrivagen 10, Kungalv, Sweden |
|---|---|---|
| [21] | Appl. No. | 714,724 |
| [22] | Filed | Mar. 20, 1968 |
| [45] | Patented | June 1, 1971 |
| [32] | Priority | Feb. 7, 1968 |
| [33] | | Sweden |
| [31] | | 1585/68 |

[54] METHOD OF SHRINKING A SLEEVE- OR CAP-SHAPED WRAPPING OF HEAT-SHRINKABLE PLASTIC SHEET SURROUNDING A TRANSPORT UNIT AND AN APPARATUS FOR CARRYING OUT THE METHOD
8 Claims, 4 Drawing Figs.

[52] U.S. Cl. ............................................. 53/30,
53/184
[51] Int. Cl. ..................................... B65b 53/02
[50] Field of Search .......................................... 53/30 (B3),
1 (B4); 229/(SC); 206/46, 45.33

[56] References Cited
UNITED STATES PATENTS
3,362,128  1/1968  James............................ 53/30X 3,402,475  9/1968  Johansen et al. ............. 53/30X
3,187,478  6/1965  Kirkpatrick .................. 53/30

*Primary Examiner*—Theron E. Condon
*Assistant Examiner*—E. F. Desmond
*Attorney*—Arnold Robinson ABSTRACT: Shrinking of a contractive wrapping of heat-shrinkable plastic sheet surrounding a transport unit composed of collected or piled objects, preferably on a pallet, is accomplished by directional heat radiation from electrical emitters mounted on one or more carriers and by effecting a relative movement between the wrapped unit and those emitters or vice versa. Selective energizing of said emitters permits irradiation of selected areas of the wrapping only for maintaining the tensile strength of the wrapping at sharp corners and edges of the transport unit. Lamination of a folded top portion of the wrapping may be effected. An apparatus for carrying out the shrinking of the wrapping comprises a carrier for a plurality of heat radiation emitters and means for effecting the relative movement. Two forms are disclosed, one in which the emitter carrier is a vertically movable, horizontal frame and one in which the emitter carrier is in the form of gates through which the wrapped transport unit is carried by conveyors.

METHOD OF SHRINKING A SLEEVE- OR CAP-SHAPED WRAPPING OF HEAT-SHRINKABLE PLASTIC SHEET SURROUNDING A TRANSPORT UNIT AND AN APPARATUS FOR CARRYING OUT THE METHOD

It is already known to keep together a plurality of objects or articles in a common transport unit, e.g. in the form of a pile, by surrounding the collected or piled parts with a sleeve- or cap-shaped wrapping of heat-shrinkable plastic sheet and subsequently bringing this wrapping to shrink by means of heating, so that it will snugly fit around the transport unit thus formed. The heat-shrinkable plastic sheets suited for this purpose are available on the open market in a variety of types with different thicknesses and shrinking properties. It is also well known that the sleeve- or cap-shaped wrappings, if desired, may be manufactured by welding together one or more plastic sheets, although the use of seamless sleeves cut off from large-sized tubings and drawn over the transport units is rather common too.

The technique in question may, of course, be applied to transport units of the most varying kinds and sizes and it has been successfully used for keeping together groups of articles or objects which have been more or less regularly piled or collected on a loading pallet to form a transport unit. In such cases these units are frequently of a considerable size.

As already indicated the shrinking of the sleeve- or cap-shaped wrapping is effected by heating the same, and up to now the necessary heating has been accomplished by inserting the entire, wrapped unit into special heating ovens, the size of which must, of course, be accommodated to the largest units to be treated.

These heating ovens are not only expensive but often very bulky and a further drawback is that considerable heat losses occur, when they are used. This is because it will be necessary to bring the whole oven chamber to the proper temperature for the plastic sheet shrinking, which is about 150°—200° C., before the desired wrapping shrinkage can be obtained on an inserted transport unit, and a great deal of this heat will, of course, be wasted when the oven is opened for the insertion and/or removal of the transport unit. Furthermore the use of the known heating ovens often causes an unsatisfactory heating of the goods contained in the transport unit, and within the ovens there is little, if any, possibility to positively control the shrinkage of the plastic sheet wrappings around the unit, since all portions of the wrapping are generally exposed to the same temperature. A positive and careful control of the shrinking process is, in fact, often desirable, because the shrunk plastic sheet portion considerably looses in elasticity, and within certain areas of the wrapping it may be desirable to maintain said elasticity, for example if the unit presents sharp corners or projections where the plastic sheet could otherwise easily burst or become penetrated.

The present invention has for its object to eliminate the said drawbacks and relates primarily to a method of shrinking a sleeve- or cap-shaped wrapping of heat-shrinkable plastic sheet surrounding a transport unit, in particular a transport unit comprising a collection of goods on a loading pallet. This method according to the invention is mainly characterized in that the heating of the plastic sheet wrapping is accomplished by means of directional heat radiation emitters and while a relative movement is effected between said emitters and the wrapped unit, the heating rays of the emitters being directed towards portions of the plastic sheet wrapping, which are located mainly in a common plane transversing the direction of said relative movement. Most advantageously this method can be applied when the plastic sheet forming the wrapping is of a radiation-absorbing type, e.g. in a dark or black color, but it has been shown in practice that also transparent shrinkable plastic sheets may be used, which may be explained by the fact that the heat radiation in the last-mentioned case causes a rapid and sudden temperature increase on the exterior surface of the transport unit, which in turn results in a strong heating of the interspace between said surface and the plastic sheet.

Without further comments, it will be clear that the method according to the invention could be carried out without inserting the wrapped transport unit in a closed room, which causes considerably reduced installation costs. The heat effect supplied is also utilized much more efficiently than in the hitherto used heating ovens, and at the same time a selective heating of only certain portions of the plastic sheet wrapping for positive control of the shrinkage thereof will be possible.

The invention also relates to an apparatus for carrying out the method described above. This apparatus is mainly characterized in that it comprises at least one carrier forming at least a partial border for an opening to be passed through by the wrapped transport unit, said carrier supporting a number of heat-radiation emitters capable of directional heat radiation, said emitters being directed inwardly towards said opening, and means to effect a relative movement between said carrier and the wrapped transport unit in order to cause said transport unit to pass through said opening. Such an apparatus presents several advantages, among which the simplicity, the small space requirement and the modest consumption of power, as compared with conventional heating ovens, may be mentioned.

Figure 2:
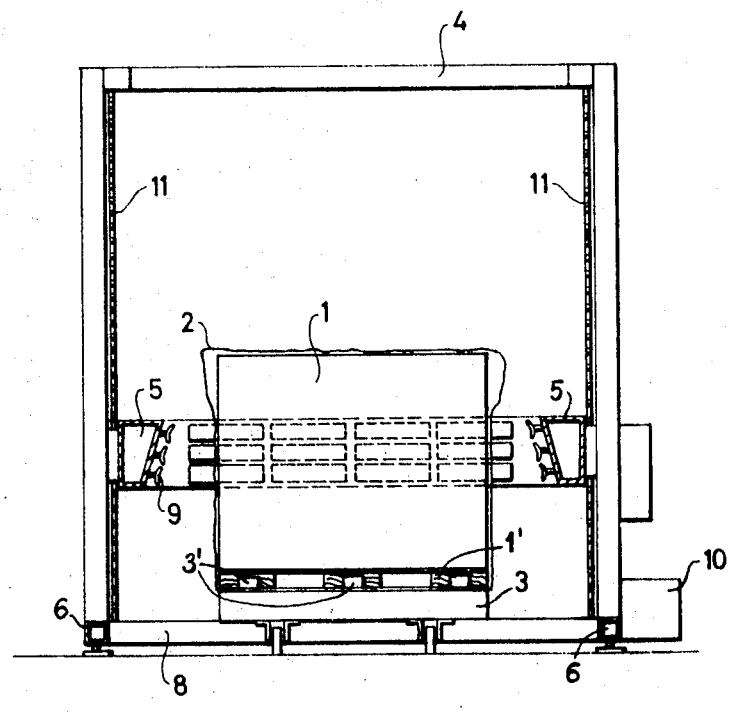
Figure 3:
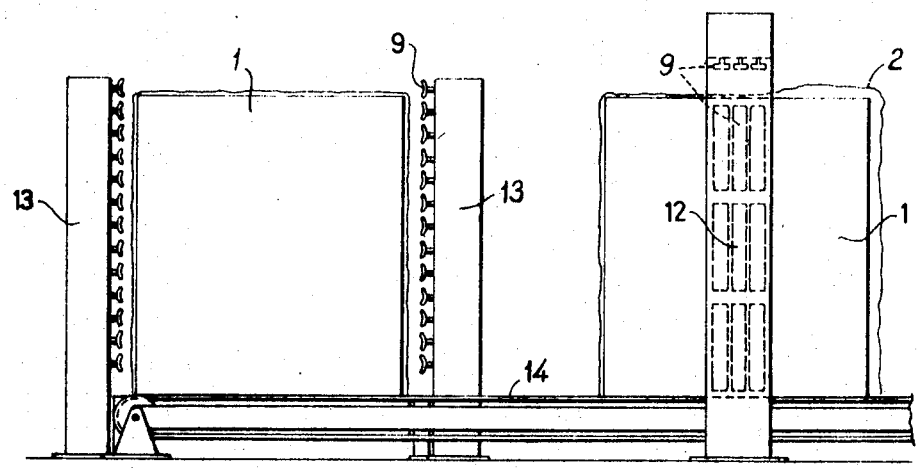
Figure 4:
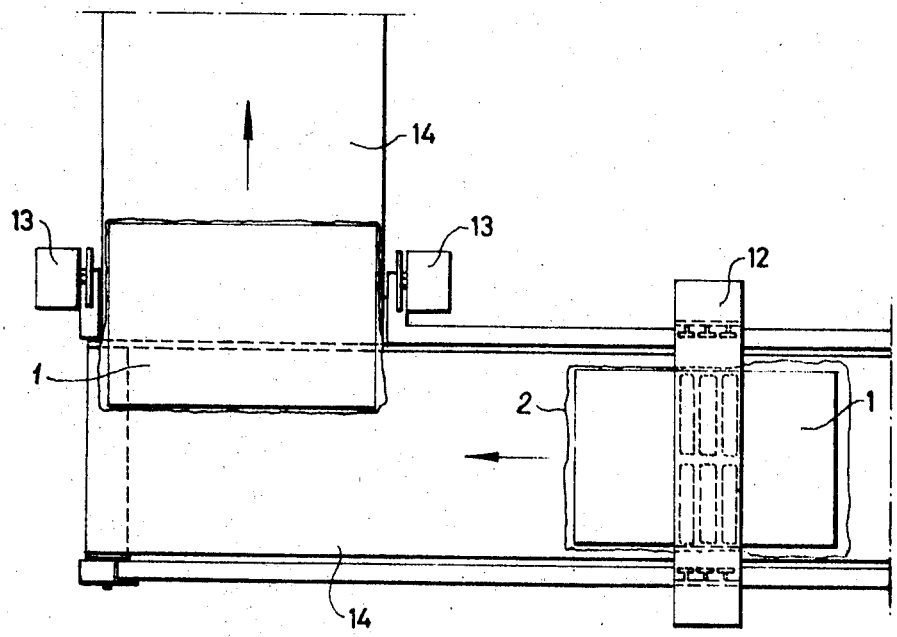

Further characteristic features of the invention will become apparent from the appended claims and from the following description of two specific embodiments of the invention, which have been illustrated on the accompanying drawings, in which FIG. 1 is a side view of a preferred form of the apparatus, FIG. 2 shows a sectional elevation as seen from the line II—II in FIG. 1, FIG. 3 is a side view of a modified form of apparatus embodying the invention, and FIG. 4 shows the apparatus of FIG. 3 as seen from above.

In FIGS. 1 and 2 numeral 1 designates a diagrammatically illustrated transport unit which in the example shown is supposed to consist of a plurality of objects or articles of any desired kind piled on a loading pallet 1' over or about which there is loosely drawn a sleeve- or cap-shaped wrapping 2 of shrinkable plastic sheet. In the case as shown the transport unit rests on a suitable truck 3, which on its top is provided with preferably spring-actuated holding means 3' capable of holding down the lower margin of the wrapping. The required shrinking of the wrapping around the unit for keeping the articles thereof firmly together is achieved by placing the unit in the position shown within a stand comprising a vertical, inverted U-frame structure 4, which supports a vertically displaceable horizontal frame 5, and the lower shank ends of which are secured to a pair of horizontal beams 6, which preferably are provided with adjustable feet 7 and which at their lower ends only are connected by means of a crossbeam 8. The truck 3 with the wrapped transport unit 1 may thus be introduced between the beams 6 from the one end of the stand, provided that the frame 5 is in an elevated position.

The vertically displaceable horizontal frame 5, which in a suitable manner is guided along the vertical shanks of the frame structure 4, serves as a carrier for a relatively great number of heat-radiation emitters 9 of a type known per se and capable of directional heat radiation. The emitters 9 are preferably evenly distributed on the inner sides of the frame 5, and the said inner sides are preferably, as best shown in FIG. 2, somewhat inclined, such that the emitters 9 will be directed obliquely downwards and inwards towards the interior of the frame 5. The vertical movements of the frame 5 are achieved by means of a suitable drive mechanism 10 cooperating with chains or belts 11, which in their turn are connected to the frame 5 and, of course, run over suitable pulleys, not shown.

When the wrapped transport unit has been introduced into the stand, the frame 5 is lowered over the same so that the emitters 9 when energized will irradiate the lower marginal portion of the plastic sheet wrapping 2, of the unit 1. As the desired shrinking of the wrapping proceeds, the frame is elevated continuously with a low speed or, possibly, stepwise, so that higher located portions of the wrapping are in their turn caused to shrink and the elevating of the frame is, of course, continued until the whole plastic sheet wrapping has been shrunk to the predetermined degree. When the lower side of the frame 5 has reached a position in which it lies flush with the upper side of the transport unit, the emitters 9 will heat and shrink also that part of the plastic sheet wrapping, which ordinarily is folded in over the top of the unit, and the last-mentioned heating is preferably allowed to continue during such an extended period of time that a lamination or melting together of the overlapping layers resulting from the folding in of the wrapping over the top of the transport unit is accomplished.

When the shrinking process is completed, the heat radiation emitters 9 are, of course, deenergized and the transport unit may be taken out, as soon as the frame 5 has been sufficiently elevated to let the unit pass beneath it. Although practical tests have shown that it is most advantageous to start shrinking at the bottom, as described, the shrinking may also take place during the downward movement of the frame 5, but in that case it must be kept in mind that the wrapping commonly shrinks to a certain degree also in its vertical direction. In a modified apparatus of the type shown in FIGS. 1 and 2, the stand 4, 6, 8 may be provided with wheels, so that it may be pushed in over a stationary transport unit located on a suitable foundation. This is particularly advantageous if the goods or articles forming the body of the transport unit are liable to form an unsteady pile.

Since the vertically displaceable frame 5 supports a great number of heat radiation emitters 9, which are arranged in a suitable pattern on the inside of each of the frame parts, it is, of course, possible during the shrinking process to energize or switch on only some of the emitters to thereby limit the heating of the plastic sheet wrapping 2 to only certain portions thereof. By so doing, shrinking of plastic sheet portions extending over sharp edges or corners of the unit may be avoided, and this may be favorable since the plastic sheet becomes considerably more fragile when shrunk than in its original condition.

In this modified arrangement according to FIGS. 3 and 4 the heat radiation emitters 9 are mounted on stationary carriers or frames 12 and 13, respectively, while the transport unit 1 together with the plastic sheet wrapping 2 therearound is moved past the emitter carriers along transport tracks 14, which in the drawing are illustrated as conveyors but which, of course, may also be in the form of roller ways or the like by means of which the transport unit may be moved at a sufficiently low speed. The emitter carrier designated by numeral 12 is formed as a doorway portal extending across a first part of the transport track 14 and provided with heat radiation emitters 9 on the inner sides of its two vertical parts as well as on the bottom side of its top piece. The other carrier 13 consists in its turn of two vertical posts located one on each side of a second part of the transport track and provided with heat-radiation emitters 9 on their inner sides facing each other. Through the first portallike carrier 12 the unit 1 is transported in its longitudinal direction, whereby the plastic sheet wrapping thereof will shrink not only at the longitudinal sides but also on top of the unit, and through the opening bordered by the two posts 13 the transport unit is then caused to pass in its transverse direction, i.e. sidewards, whereby the plastic sheet wrapping will shrink also at the short sides or ends of the unit. Of course, also in this case, the heat radiation may be limited to only certain portions of the plastic sheet wrapping by nonenergizing of certain emitters of by energizing said emitters only during a part of the time needed for the passage of the transport unit past the emitter carrier in question, as the case may be.

Obviously various detail modifications may be made in the two forms of apparatus herein shown without departing from the scope of the invention. Thus for example, it may in certain instances be sufficient to let the transport unit with its related plastic sheet wrapping pass only one of the heat emitter carriers in the example shown in FIGS. 3 and 4, so that shrinking is effected only on two opposite sides of the unit. Instead of moving the unit past the carriers 12 and 13 in FIGS. 3 and 4 it is, of course, also possible to keep the transport unit stationary and to construct the carrier itself as a carriage, which is capable of moving relative to the unit.

In order to avoid oblique stretching of the wrapping formed by the plastic sheet around the transport unit during the shrinkage thereof, it has proved valuable to use a symmetric heat irradiation, i.e. always to irradiate and thereby shrink two opposite vertical side portions of the wrapping simultaneously. For the same reason the irradiation of the wrapping should preferably always be effected within areas of said wrapping located in a common plane, which is perpendicular to the direction of the relative movement between the transport unit and the heat-radiation emitters during the shrinking procedure.

I claim:

1. An apparatus for shrinking a wrapping of heat-shrinkable plastic sheet material surrounding a transport unit, comprising an emitter carrier frame positioned adjacent said unit, a plurality of directional heat radiation emitters mounted on said emitter carrier frame in position to direct radiant heat toward at least one side of said unit within a restricted zone having a major extension in horizontal direction and a minor extension in vertical direction that is less than the height of said unit wrapping and means for effecting relative vertical movement between said carrier frame and unit to cause said radiant heat to shrink successive restricted zones of said wrapping material wherein said carrier frame has a main extension in a horizontal plane and wherein said means for effecting relative vertical movement between said transport unit and carrier frame.

2. An apparatus according to claim 1, wherein said directional heat emitters are mounted on said mainly horizontal carrier frame in a manner to direct them obliquely downwards.

3. An apparatus according to claim 1, wherein said carrier frame forms a horizontal enclosure with four sides that forms an opening to be passed by said wrapped unit.

4. A method of shrinking a wrapping of heat-shrinkable plastic sheet surrounding a transport unit comprising a collection of goods on a common load carrier, which comprises the steps of subjecting the unit with its plastic sheet wrapped to directed heat radiation from a plurality of directional heat-radiation emitters, selectively energizing and deenergizing said directional heat-radiation emitters to heat only limited portions of the plastic sheet wrapping of the transport unit while effecting a relative movement between said emitters and the wrapped unit and while directing said emitters towards portions of the plastic sheet wrapping which are located mainly along lines tranversing the direction of said relative movement.

5. An apparatus according to claim 1 that includes means for energizing and deenergizing selected groups of said plurality of heat radiation emitters.

6. An apparatus according to claim 1 which includes a carrier frame positioned adjacent each opposite side of said unit to heat the two opposite sides of said transport unit wrapper.

7. An apparatus for shrinking a wrapper of heat-shrinkable plastic sheet material surrounding a transport unit, comprising a transport track for said wrapped unit, said transport track being composed of two portions along the first of which the wrapped unit is caused to move in one direction along one axis of the unit and along the second of which the wrapped unit is caused to move in another direction along a second axis of the transport unit mainly perpendicular to said first axis, a first pair of emitter carrier frames each having a main extension in a vertical direction and being positioned on opposite sides of said first track portion, a second pair of emitter carrier frames each having a main extension in a vertical direction and being positioned on opposite sides of said second track portion, a plurality of directional heat radiation emitters mounted on each of said carrier frames in position to direct radiant heat towards opposite sides of the wrapped unit passing therethrough, whereby the plastic sheet wrapping of the transport unit is first heated on two opposite sides thereof and subsequently on the two remaining sides thereof.

8. An apparatus according to claim 7, wherein said heat radiation emitters mounted on said first and second frameworks are capable of being energized and deenergized in selected groups.

UNITED STATES PATENT OFFICE
CERTIFICATE OF CORRECTION

Patent No. 3,581,458          Dated June 1, 1971

Inventor(s) Olov Erland Gustavsson

It is certified that error appears in the above-identified patent and that said Letters Patent are hereby corrected as shown below:

Column 4, line 31, after "means" insert --includes elevating means and stationary supporting means--.

Column 4, line 44, delete "wrapped" and insert --wrapping--.

Signed and sealed this 18th day of January 1972.

(SEAL)
Attest:

EDWARD M. FLETCHER, JR.
Attesting Officer

ROBERT GOTTSCHALK
Acting Commissioner of Patents